(12) United States Patent
Schmidt et al.

(10) Patent No.: US 8,531,422 B2
(45) Date of Patent: Sep. 10, 2013

(54) INTRINSICALLY SAFE TOUCH SCREEN FOR PROCESS EQUIPMENT

(75) Inventors: Glen Eugene Schmidt, Bartlesville, OK (US); Kashif Mansoor, Bartlesville, OK (US)

(73) Assignee: Siemens Aktiengesellschaft, München (DE)

( * ) Notice: Subject to any disclaimer, the term of this patent is extended or adjusted under 35 U.S.C. 154(b) by 192 days.

(21) Appl. No.: 13/230,353

(22) Filed: Sep. 12, 2011

(65) Prior Publication Data

US 2013/0063365 A1   Mar. 14, 2013

(51) Int. Cl.
*G06F 3/041* (2006.01)

(52) U.S. Cl.
USPC .......................................... 345/173

(58) Field of Classification Search
USPC ................. 345/173, 174, 204, 211, 212
See application file for complete search history.

(56) References Cited

U.S. PATENT DOCUMENTS

| | | | |
|---|---|---|---|
| 5,675,238 A * | 10/1997 | Asao ................................ | 322/28 |
| 6,534,956 B2 * | 3/2003 | Yang ............................... | 320/154 |
| 6,927,954 B2 * | 8/2005 | Boudreaux et al. ............. | 361/42 |
| 7,053,504 B2 * | 5/2006 | Ketteler ........................... | 307/72 |
| 7,296,426 B2 * | 11/2007 | Butler et al. .................... | 62/181 |
| 7,542,578 B2 * | 6/2009 | Akino ............................. | 381/113 |
| 7,744,818 B2 | 6/2010 | Iwamoto et al. | |
| 7,784,291 B2 * | 8/2010 | Butler et al. .................... | 62/129 |
| 7,800,245 B2 * | 9/2010 | Michalko ......................... | 307/19 |
| 7,875,797 B2 * | 1/2011 | Moser ............................. | 174/50 |
| 8,159,804 B2 | 4/2012 | Otto | |
| 2006/0124897 A1* | 6/2006 | Shingai et al. ........... | 252/299.01 |
| 2011/0091983 A1 | 4/2011 | Elders et al. | |
| 2011/0107816 A1 | 5/2011 | Barth | |
| 2012/0042712 A1 | 2/2012 | Kishi et al. | |
| 2012/0118144 A1 | 5/2012 | Cates | |
| 2012/0164960 A1 | 6/2012 | Levan et al. | |

FOREIGN PATENT DOCUMENTS

| | | |
|---|---|---|
| CN | 101887052 A | 11/2010 |
| CN | 201689079 U | 12/2010 |
| CN | 201804514 U | 4/2011 |
| CN | 201908691 U | 7/2011 |
| CN | 202041515 U | 11/2011 |
| CN | 102507811 A | 6/2012 |
| EP | 1693944 A2 | 8/2006 |
| JP | 2011169778 A | 9/2011 |
| JP | 2011226945 A | 11/2011 |
| WO | WO 0062394 A1 | 10/2000 |
| WO | 2011027172 A1 | 3/2011 |
| WO | 2011044547 A2 | 4/2011 |
| WO | 2011092651 A1 | 8/2011 |

OTHER PUBLICATIONS

MTL670 Series—Touch Screen Computers & Monitor (8 pages).
Process Automation Packaged Solutions: HMI Displays & Workstations (6 pages).
Texas Instruments: 4-Wire and 8-Wire Resistive Touch-Screen Controller Using the MSP430, Brenner, GOH, & Sullivan, 2010, Dallas, TX (12 pages).
Signion Systems PCt. Ltd.: Innovative Solutions in Digital Signal Processing (2 pages).

* cited by examiner

*Primary Examiner* — Fred Tzeng (57) ABSTRACT

An intrinsically safe touch screen system includes a touch screen, a current limiting barrier coupled to the touch screen, a touch screen controller, and a voltage limiting barrier. The controller is coupled to the current limiting barrier, the voltage limiting barrier, and the touch screen, in a configuration such that signals transmitted to and from the touch screen will be within a level that ensures intrinsic safety of the touch screen.

21 Claims, 6 Drawing Sheets

INTRINSICALLY SAFE TOUCH SCREEN FOR PROCESS EQUIPMENT

BACKGROUND

This document is related to a touch sensitive screen interface. In particular embodiments, this document describes an intrinsically safe touch screen interface that can be used in process equipment environments.

Touch sensitive screens are used to control many electrical and mechanical devices. However, in industrial applications where explosive gasses or dusts may be present, touch screen interfaces have not been suitable for process equipment control because of the potential that the spark generated by the interface could create a hazardous condition. In hazardous environments, controllers have been limited to traditional metal covered keypads, explosion proof sealed mechanical switches, pneumatically purged membrane switches and similar devices, all of which keep the electrical hazard away from the explosive gas or dust.

With the advent of touch screen technology in cell phones, laptops, global positioning system (GPS) devices, and many other consumer and non-hazardous area industrial devices, it is desirable to develop a touch screen device that can be used with hazardous area process equipment or otherwise within such hazardous areas. Such a touch screen device can be considered intrinsically safe (IS) for this application. This document describes a touch-screen device that is directed to some or all of the problems listed above.

SUMMARY

In an embodiment, a touch screen system includes a touch screen, a current limiting barrier coupled to the touch screen, a touch screen controller, and a voltage limiting barrier. The controller is coupled to the current limiting barrier, and also indirectly coupled to the touch screen via the current limiting barrier, so that a signal transmitted between the controller and the touch screen will travel through the current limiting barrier. The voltage limiting barrier is coupled to the touch screen controller and to a power supply. The voltage limiting barrier is also indirectly coupled to the touch screen via the touch screen controller and the current limiting barrier.

In certain embodiments, the touch screen is a resistive touch screen having a set of drive and/or sense wires, while the current limiting barrier includes a set of resistors so that each drive or sense wire of the resistive touch screen is coupled to one of the resistors in the current limiting barrier. The resistive touch screen may be of the 4-wire type, the 8-wire type or another type.

When a 4-wire touch screen is used, in some embodiments the screen may include: (i) a first screen member coated with a first layer of resistive material and having a first pair of conductive bars positioned to impart a voltage in a first direction across the first screen member when energized; (ii) a second screen member coated with a second layer of resistive material and having a second pair of conductive bars positioned to impart a voltage in a second direction across the second screen member when energized, wherein the second direction is perpendicular to the first direction; (iii) a spacer positioned between the first and second screen members; and (iv) four drive lines, wherein each member of a first pair of the four drive lines is coupled to one member of the first pair of conductive bars, and each member of a second pair of the four drive lines is coupled to one member of the second pair of conductive bars. The current limiting barrier may then include four pairs of resistors configured so that a first resistor in each pair is coupled to one of the four drive lines, while the second resistor in each pair is coupled to the drive line coupled to the first resistor as a sense line.

When an 8-wire touch screen is used, in some embodiments the screen may include: (i) a first screen member coated with a first layer of resistive material and having a first pair of conductive bars positioned to impart a voltage in a first direction across the first screen member when energized; (ii) a second screen member coated with a second layer of resistive material and having a second pair of conductive bars positioned to impart a voltage in a second direction across the second screen member when energized, wherein the second direction is perpendicular to the first direction; (iii) a spacer positioned between the first and second screen members; (iv) four sense lines; and (v) four drive lines. The current limiting barrier may then include four pairs of resistors, configured so that a first resistor in each pair is coupled to one of the four drive lines, and the second resistor in each pair is coupled to the drive line coupled to the first resistor as a sense line.

In certain embodiments, the voltage limiting barrier may include a first shunt device coupled to a power source and to a power input of the touch screen controller, a second shunt device coupled to a data input port of the touch screen controller, and a third shunt device coupled to a data output port of the touch screen controller. Any or all of the shi devices may be zener barriers or other shunt devices.

In certain embodiments, the current limiting barrier limits current to the touch screen to a level that is intrinsically safe. In addition, the current limiting barrier and the voltage limiting barrier in operation together may form an intrinsically safe barrier. The touch screen may be located in a hazardous area, and the current limiting barrier, the touch screen controller and the voltage limiting barrier are located in a non-hazardous area. The non-hazardous area may include an enclosure and/or an area that is physically is isolated from the hazardous area.

DETAILED DESCRIPTION

The invention described below is not limited to the particular systems, methodologies or protocols described, as these may vary. The terminology used in this document is for the purpose of describing particular embodiments only, and is not intended to limit the scope of the present disclosure.

As used in this document and in the appended claims, the singular forms "a," "an," and "the" include plural reference unless the context clearly dictates otherwise. Unless defined otherwise, all technical and scientific terms used in this document have the same meanings as commonly understood by one of ordinary skill in the art. As used in this document, the term "comprising" means "including, but not limited to."

As used in this document, the term "coupled" means electrically connected, directly or indirectly through one or more elements.

As used in this document, the term "intrinsically safe", when used in connection with a device, means that the device is unable to release sufficient energy, by either thermal or electrical means, to cause an ignition of a flammable gas. In order to have a fire or explosion, fuel, oxygen and a source of ignition must be present. An intrinsically safe (IS) system that operates in an atmosphere where fuel and oxygen are present is designed no that the electrical energy or thermal energy of a particular instrument loop can never be great enough to cause ignition. There are various IS standards set forth by various certifying agencies for a system to be considered IS. Such standards include International Electrical Commission (IEC) IEC 60079-11, Factory Mutual (FM) 3610, Underwriters Laboratories (UL) UL913, and Canadian Standards Association GAN/CSA-C22.2 No. 157-92. In some embodiments, an IS device may be designed to be incapable of releasing energy to the atmosphere at a level that exceeds 20 microjoules. In other embodiments, the IS device may be designed to be incapable of releasing energy to the atmosphere at a level that exceeds 40 microjoules.

At least some of the figures and descriptions below have been simplified to focus on elements that are relevant for a clear understanding of the disclosure, while eliminating, for purposes of clarity, other elements that those of ordinary skill in the art will appreciate may also comprise a portion of the invention. However, because such elements are well known in the art, and because they do not necessarily facilitate a better understanding of the invention, a description of all such elements is not provided below.

Figure 1:
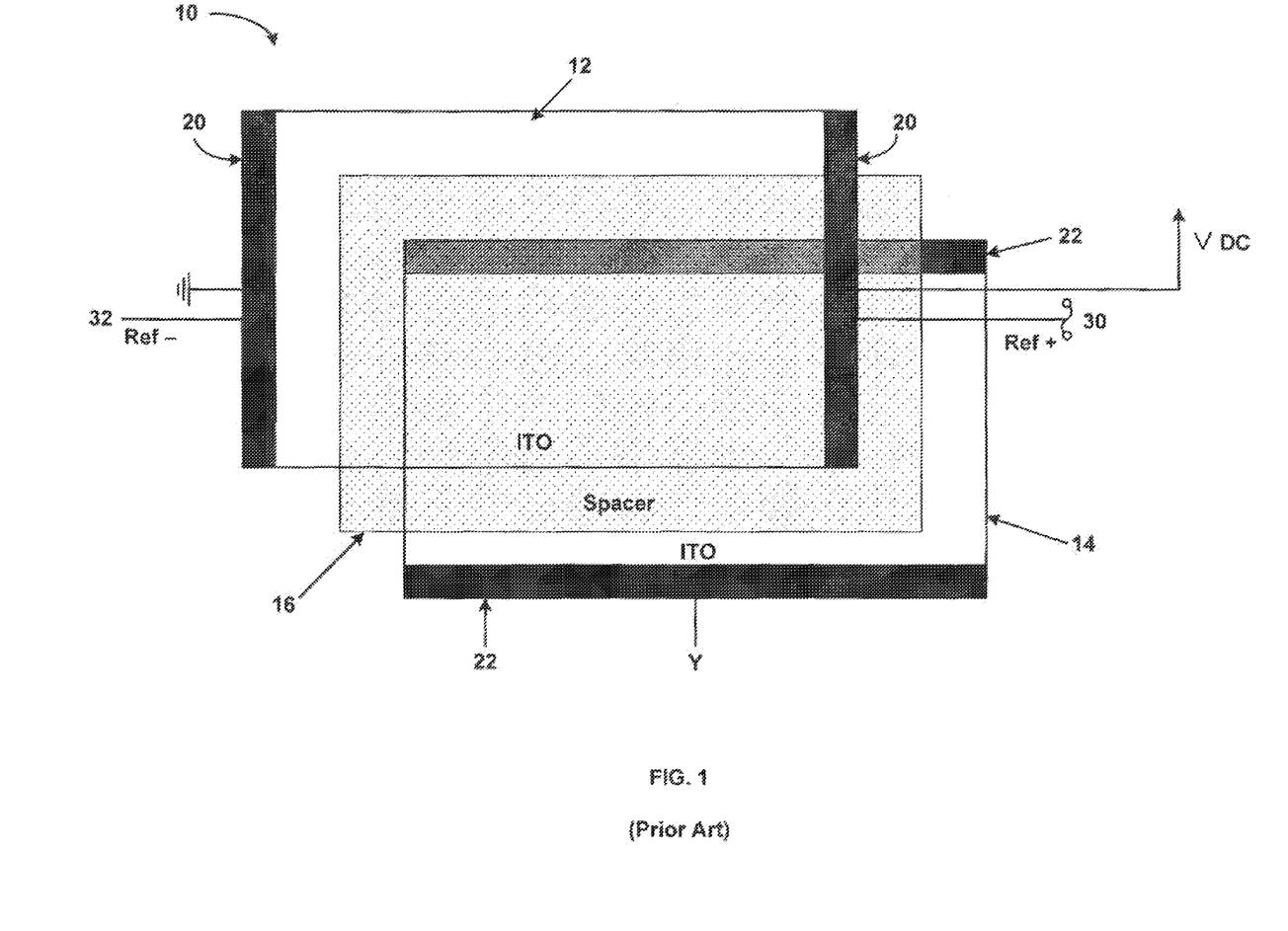
FIG. 1 illustrates components of an exemplary prior art touch screen.

In order to clarify the following embodiments, a brief description of a resistive touch screen device is provided herein. FIG. 1 illustrates a resistive touch screen 10, such as may be found in the prior art. The touch screen includes a pair of flexible members 12, 14. Each flexible member 12, 14 has a resistive material layer applied to a single face. The members are oriented so that the resistive layers face each other, and the members are separated by one or more spacers 16. Each member is capable of encoding a direction, either x or y, by including a set of wires that extend in the x-direction or the y-direction. Each member also has a pair of opposing conductive bars 20, 22, with the x encoding conductive bars 20 on the first member being oriented at 90 degrees with respect to they encoding bars 22 on the second member. Each conducting bar is coupled to a line 30, 32, which may be either a drive line or a sense line.

In a 4-wire touch screen device, each line may serve both as a sense and a drive function. Alternatively, in an 8-wire touch screen device, the sense lines are distinct from the drive lines. The conductive bars are alternately energized and sensed through their respective lines. Thus, for example, the x encoding bars on the first member are energized through their drive lines to place a voltage across the resistive material layer of the first member, and the y encoding bars on the second member are energized through their drive lines to place a voltage across the resistive material layer of the second member. A touch screen controller controls the order of the application of the energizing voltage between the two members. While one flexible member is being energized through its drive lines, the sense lines of the other flexible member are measured by the controller.

When pressure is applied to the touch screen, the two resistive material layers come into contact with each other. White one member is being energized, the second member conducts the voltage from its sense lines to the controller. The location of the point of contact between the conductive bars of the energized member is measured as a fraction of the voltage drop between the two conductive bars, similar to the voltage measured on the wiper of a potentiometer.

As noted above, for a 4-wire touch screen, the drive lines of the first member are used as the sense lines of that member when the second member is energized, and the drive lines of the second member are used as the sense lines of that member when the first member is energized. For an 8-wire touch screen, each member has a pair of dedicated drive and sense lines.

Figure 2:
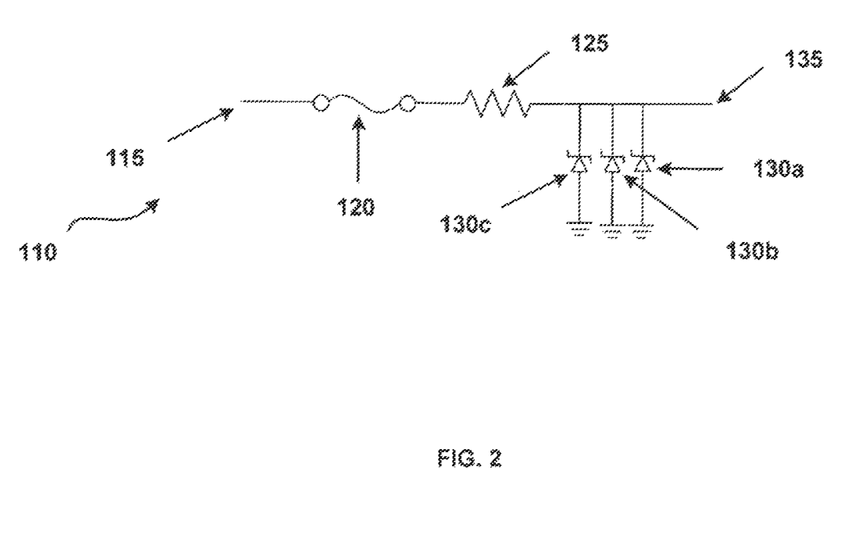
FIG. 2 is a diagram showing electrical components of a simple zener barrier.

FIG. 2 illustrates a simple zener diode-based barrier system 110. The zener barrier system obtains a voltage from a voltage source at a first terminal 115 and provides an intrinsically safe open circuit voltage output at a second terminal 135. It is understood that the voltage source may provide any level of voltage including, but not limited to, 250 VAC at 1500 A, 5 VDC at 5 A, or any other voltage level for an analog or digital data signal. The components of zener barrier 110 are configured so that an output at terminal 135 is limited both in its maximum voltage (through a voltage limiting barrier) and in its maximum current (through a current limiting barrier). Zener diodes 130*a-c* provide the voltage limiting barrier for this barrier system by directing potentially hazardous energy to the ground. A fuse 120 and/or optional resistor 125 together provide the current limiting barrier. While either the fuse 120 or the resistor alone may provide this function, fuse 120 and resistor 125 may both be included to help protect zener diodes 130*a-c* from failure—for example before fuse 120 is activated. In one embodiment, resistor 125 may be used where:

$$1.5 \times 1.7 \times \{\text{fuse rating}\} \times \{\text{maximum tolerance voltage of zeners}\} > \{\text{zeners power rating}\}/1.5$$

to reduce the power in the zener diode 130, such that the zener diode power rating and de-rating are not violated.

Figure 3:
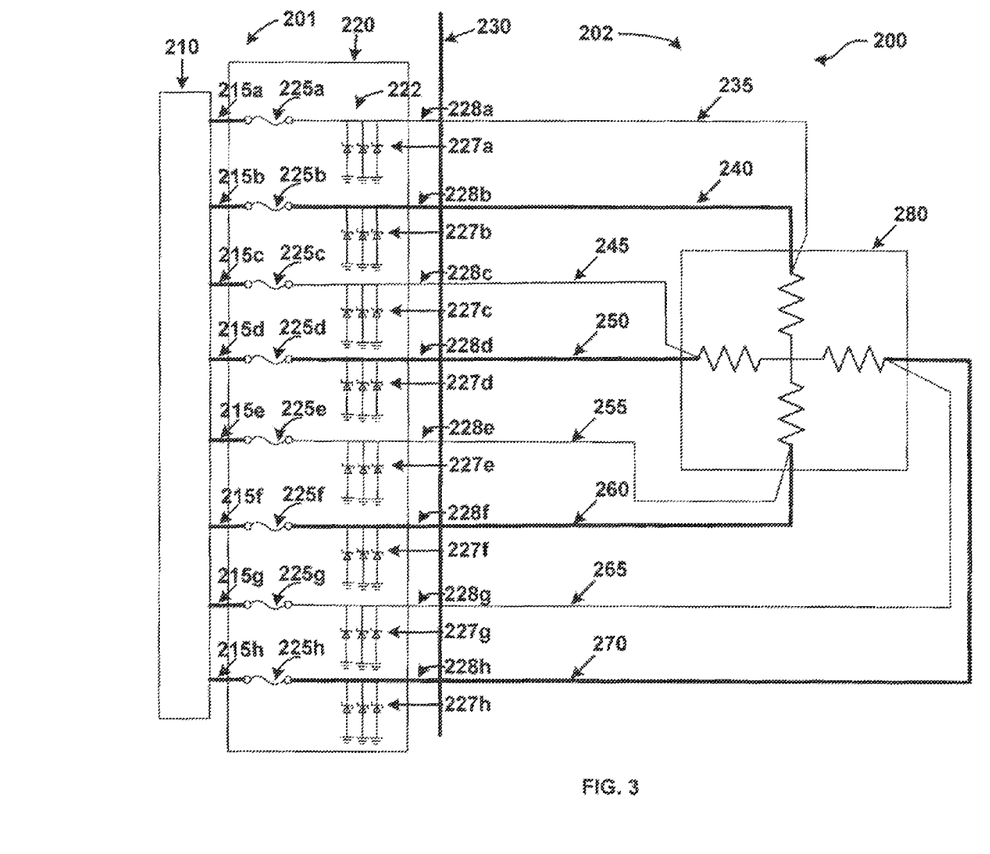
FIG. 3 is a diagram showing electrical components of a simple intrinsically safe barrier for an 8-wire resistive touch screen.

FIG. 3 illustrates an embodiment 200 of a set of simple IS barriers used in conjunction with an 8-wire resistive touch screen device. A touch screen controller 210 may be located in safe area 201 where the controller is not required to have IS characteristics. Resistive touch screen device 280 may be located in hazardous area 202 and is required to be intrinsically safe. Division 230 marks a boundary between the two areas. Is understood that safe area 201 may be physically removed from hazardous area 202, for example being in a separate room or building, or behind a protective barrier. Alternatively, safe area 201 may comprise an enclosed container physically located within hazardous area 202, but maintained in a safe condition. In one embodiment such a container my be sealed and continuously purged with a gas to prevent any hazardous dust or gas from reaching the enclosed electronics.

The embodiment in FIG. 3 illustrates an IS barrier coupled to an eight-wire resistive touch screen device 280. The touch screen device has a total of eight lines for input and output purposes: a +Y sense line 235, a +Y drive line 240, a −X sense line 245, a −X drive line 250, a −Y sense line 255, a −Y drive line 260, a +X sense line 265 and a +X drive line 270. The drive lines function to provide input voltage to the touch screen, while the sense lines provide the voltage outputs from the resistive touch screen. In the embodiment illustrated in FIG. 2, each of the eight lines passes through a separate channel of an eight channel barrier 220 with a zener barrier provided for each channel. Each of the eight channel barriers 220 comprises two sides: a safe-side coupled to devices located in the safe area 201, such as touch screen controller 210, and a hazardous-side coupled to resistive touch screen 280 located in hazardous area 202. Thus, barrier 220 has eight safe-side I/O lines 215a-h and eight hazardous-side I/O lines 228a-h. As the barrier electronics are essentially the same for each safe-side/hazardous-side channel, only channel 222, corresponding to line 215a and line 228a, will be described further. It is understood, however, that the disclosure regarding this channel applies as well to the other channels in the barrier.

Channel 222 comprises a safe-side I/O line 215a coupled to one I/O line of touch screen controller 210, and a hazardous-side I/O line 228a coupled to +Y sense line 235 of the resistive touch screen 280. As illustrated in FIG. 3, each channel of eight-channel barrier 220 has a hazard-side I/O line coupled to a single line from the touch screen 280. For example, hazard-side line 228b is coupled to +Y drive line 240, hazard-side line 228c is coupled to −X sense line 245, and so forth. Within channel 222, safe-side I/O 215a is coupled to hazard-side I/O 228a through fuse 225a. Fuse 225a, and equivalent fuses 225b-h, serves as a current limiting barrier equivalent to fuse 120 in FIG. 2. Three parallel zener diodes 227a coupled to hazard-side I/O line 228a provide the voltage limiting barrier equivalent to zener diodes 30a-b in FIG. 2. It can be appreciated that zener diodes 227b-h also comprise the voltage limiting barriers for their respective channels. It is understood that the zener barriers used in the touch screen systems are not limited to three-diode embodiments, and any number of zener diodes may be used in each zener barrier. In addition, instead of or in addition to the zener barriers, other shunt devices such as one or more galvanically isolated barriers may be used in each channel. Examples of galvanically isolated barriers are shown in U.S. Pat. No. 7,898,786, the disclosure of which is incorporated herein by reference in its entirety.

While barrier 220 provides an effective mechanism to assure resistive touch screen 280 is intrinsically safe, several limitation to this embodiment may be considered. Fuses 225a-h can be costly in quantity for such an application. Further, the inherent capacitance of diodes 227a-h may reduce the responsiveness of the touch screen through coupling to the inherent resistance of the touch-screen members. Alternative embodiments are therefore provided in the remaining figures.

Figure 4:
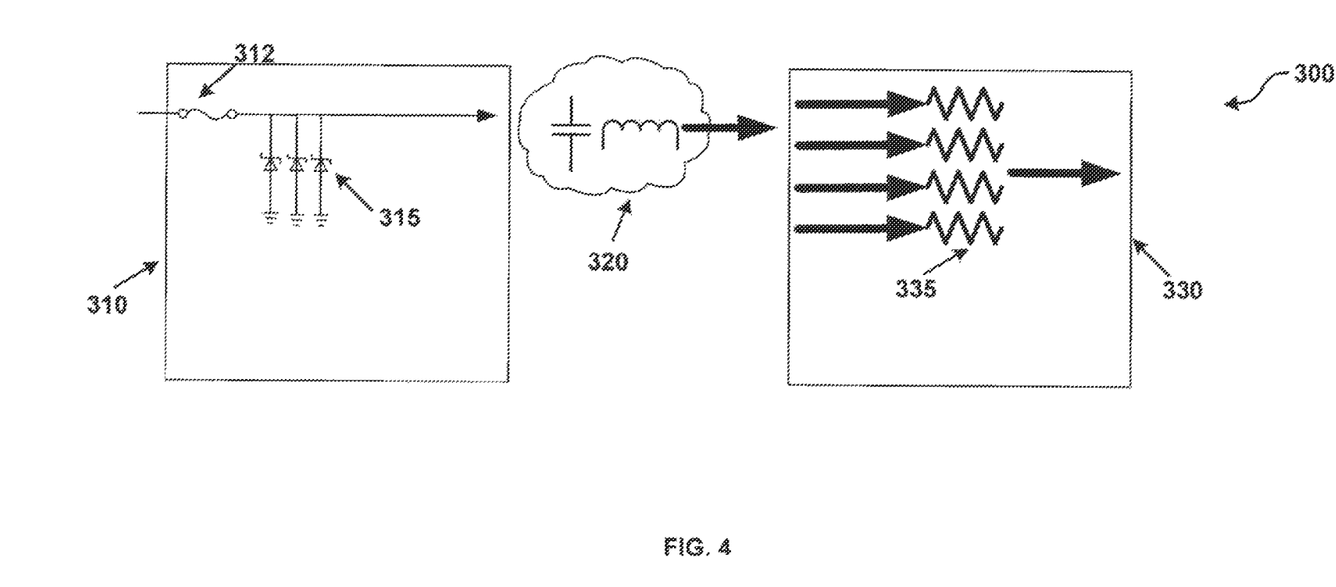
FIG. 4 illustrates an arrangement of components to form an intrinsically safe barrier.

FIG. 4 illustrates an alternative concept for an IS barrier for a resistive touch screen device. In this embodiment 300, a voltage limiting barrier 310 may comprise a zener barrier having a fuse 312 and diodes 315. Additionally, a current limiting barrier 330 may comprise a set of resistors, such as resistor 335. Other components, 320, such as one or more capacitors and/or inductors to provide energy storing capability, may be coupled between the voltage barrier and current barrier. It can be appreciated that the output(s) of embodiment 300 is (are) still intrinsically safe, in that both a voltage limiting barrier and a current limiting barrier are in place. However, such a configuration can provide benefits to overcome the difficulties of large component numbers and capacitive signal degradation.

Figure 5:
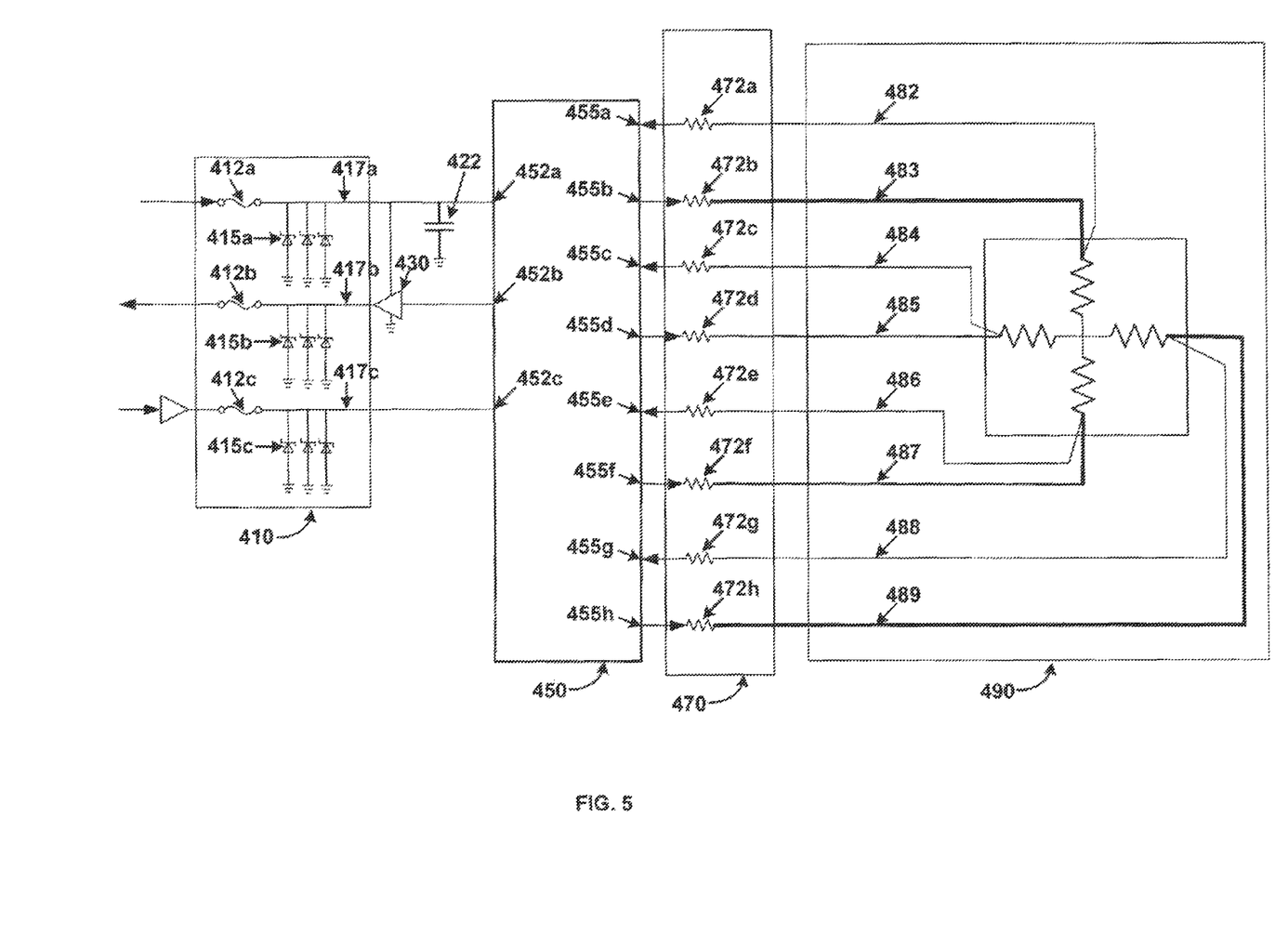
FIG. 5 is a diagram showing electrical components of an embodiment of an intrinsically safe 8-wire resistive touch screen system.

FIG. 5 illustrates an application of the embodiment illustrated in FIG. 4 for an 8-wire resistive touch screen system, in this embodiment, touch screen controller 450 is coupled to both the voltage limiting barrier 410 and current limiting barrier 470. Touch screen controller 450 comprises a set of control lines 455a-h that are coupled to resistive touch screen device 490 through a set of current limiting resistors 472a-h, each resistor comprising a current limiting channel in current limiting barrier 470. Each current limiting resistor 472 is coupled to resistive touch screen device 490 through one of the sense lines (482, 484, 486, and 488) or one of the drive lines (483, 485, 487, and 489). Thus, a signal transmitted to the touch screen device 490 from touch screen controller 450 through any one of the drive lines (483, 485, 487, and 489), is coupled through the current limiting barrier 470. Similarly, a signal received from touch screen controller 450 by touch screen device 490 through any one of the sense lines (482, 484, 486, and 488) is coupled through the current limiting barrier 470.

Touch screen controller 450 also comprises a power input 452a coupled to a power supply, and communications lines 452b (data output port) and 452c (data input port). Although FIG. 4 shows two communications lines, other configurations such as an inter-integrated circuit (I2C) bus, a serial peripheral interface (SPI) bus, or other interface structures may be used. Voltage limiting barrier 410 comprises three channels 417a-c, each channel comprising a zener barrier that includes a fuse, 412a-c, respectively, coupled to a set of three zener diodes 415a-c, respectively, that may direct energy to ground. It is noted that the use of three diodes is only exemplary, and any suitable number of diodes may be used. In addition, power line 452a is coupled to a surge suppressing, filtering or bypass capacitor 422 to ground, and transmit line 452b is coupled through transmit buffer 430 to voltage limiting channel 417b. It can be appreciated that fewer zener barriers are required for the IS barrier in the embodiment in FIG. 5 compared to that in FIG. 3. Only three fuses 412a-c are required in voltage limiting barrier 410, as well as only three sets of diodes 415a-c. In addition, the capacitance of diodes 415a-c may have less effect or no effect on the response of the resistive touch screen system compared to the embodiment illustrated in FIG. 3.

Figure 6:
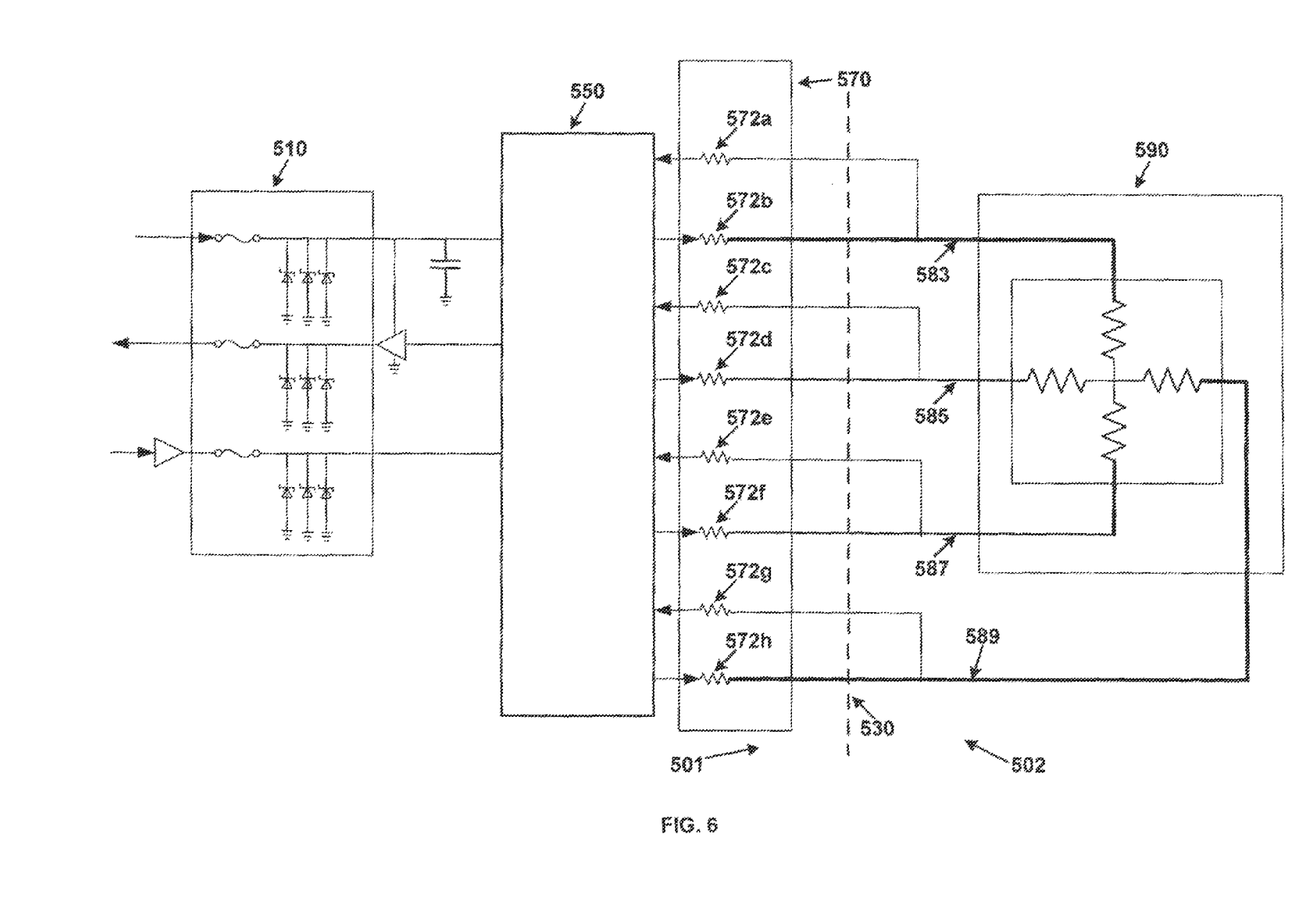
FIG. 6 is a diagram showing electrical components of an embodiment of an intrinsically safe 4-wire resistive touch screen system.

FIG. 6 illustrates yet another embodiment of the IS resistive touch screen system, in which a 4-wire resistive touch screen device 590 is used. It can be appreciated that FIG. 6 illustrates many equivalent elements of FIG. 5. Specifically, voltage limiting barrier 510 is equivalent to voltage limiting barrier 410, touch screen controller 550 is equivalent to touch screen controller 450, and current limiting barrier 570 is equivalent to current limiting barrier 470. However, resistive touch screen device 590 only comprises drive lines 583, 585, 587, and 589. In the embodiment illustrated in FIG. 6, each drive line is further coupled to a second current limiting resistor in the current limiting barrier 570. For example, +Y drive line 583 is coupled both to +Y drive limiting resistor 572b, as well as to +Y sense limiting resistor 572a. Similarly, −X drive line 585, −Y drive line 587 and +X drive line 589, are coupled to their respective drive limiting resistors 572d, 572f, and 572h, as well as to sense limiting resistors, 572c, 572e, 572g, respectively.

FIG. 6 further illustrates the potential placement of the components of the touch screen system within safe versus hazardous environments. Boundary line 530 divides a safe or non-hazardous area 501 from a hazardous area 502. As a result of the IS barrier provided by the combination of voltage limiting barrier 510 and current limiting barrier 570, touch screen 590 can be considered intrinsically safe. Thus, the touch screen 590 can be physically located in a hazardous area 502. The other components illustrated in FIG. 6, including current limiting barrier 570, touch screen controller 550, and voltage limiting barrier 510, can be located in a safe or non-hazardous area 501. The safe area may be physically distant from the hazardous area, such as being a separate room, in which case the resistive touch screen drive lines 583, 585, 587, and 589 may be required to extend a distance necessary to convey the signals carried in those lines to the rest of the components.

It should be understood that in an embodiment using an 8-wire resistive touch screen device (such as illustrated in FIG. 5), the additional sense lines would also be required to extend a similar distance to the remaining electronic components. Alternatively, the safe or non-hazardous area 501 may comprise a seated container physically located within the hazardous area. Such a container, for example, may include one that comprises a gas-tight gasket and which is further purged with a non-hazardous gas to remove or expel any hazardous gas originating from the hazardous area.

In addition, the embodiments described in this document are not limited to 4-wire and 8-wire resistive touch screens. Any number of drive or sense wires may be used depending on the desired resolution, or accuracy, of the device in relating touches to particular screen locations. Example alternatives include a 5-wire device that includes four wires in an x, y configuration on one resistive layer and an electrode ($5^{th}$ wire) on the other resistive layer. Alternatively, although a resistive touch screen may provide a faster response and/or higher resolution than other types of touch screens, capacitive touch screens or other types of touch screens may be used.

While several embodiments of the invention have been described in this document by way of example, those skilled in the art will appreciate that various modifications, alterations, and adaptations to the described embodiments may be realized without departing from the spirit and scope of the invention defined by the appended claims.

What is claimed is:

1. A touch screen system, comprising:
    a touch screen;
    a current limiting barrier coupled to the touch screen;
    a touch screen controller coupled to the current limiting barrier, wherein the controller is also indirectly coupled to the touch screen via the current limiting barrier so that a signal transmitted between the controller and the touch screen will travel through the current limiting barrier; and
    a voltage limiting barrier coupled to the touch screen controller and to a power supply, wherein the voltage limiting barrier is also indirectly coupled to the touch screen via the touch screen controller and the current limiting barrier.

2. The system of claim 1, wherein the current limiting barrier limits current to the touch screen to a level that is intrinsically safe.

3. The system of claim 1, wherein the current limiting barrier and the voltage limiting barrier in operation together form an intrinsically safe barrier.

4. The system of claim 1, wherein:
    the touch screen comprises a resistive touch screen having a plurality of drive and/or sense wires; and
    the current limiting barrier comprises a plurality of resistors, wherein each of the wires of the resistive touch screen is coupled to one of the resistors in the current limiting barrier.

5. The system of claim 1, wherein:
    the touch screen comprises a 4-wire resistive touch screen having:
        a first screen member coated with a first layer of resistive material and having a first pair of conductive bars positioned to impart a voltage in a first direction across the first screen member when energized,
        a second screen member coated with a second layer of resistive material and having a second pair of conductive bars positioned to impart a voltage in a second direction across the second screen member when energized, wherein the second direction is perpendicular to the first direction,
        a spacer positioned between the first and second screen members, and
        four drive lines, wherein each member of a first pair of the four drive lines is coupled to one member of the first pair of conductive bars, and each member of a second pair of the four drive lines is coupled to one member of the second pair of conductive bars; and
    the current limiting barrier comprises:
        four pairs of resistors, wherein a first resistor in each pair is coupled to one of the four drive lines, and the second resistor in each pair is coupled to the drive line coupled to the first resistor as a sense line.

6. The system of claim 1, wherein:
    the touch screen comprises an 8-wire resistive ouch screen having:
        a first screen member coated with a first layer of resistive material and having a first pair of conductive bars positioned to impart a voltage in a first direction across the first screen member when energized,
        a second screen member coated with a second layer of resistive material and having a second pair of conductive bars positioned to impart a voltage in a second direction across the second screen member when energized, wherein the second direction is perpendicular to the first direction,
        a spacer positioned between the first and second screen members,
        four sense lines, and
        four drive lines; and
    the current limiting barrier comprises:
        eight resistors, wherein each resistor is coupled to one of the four drive lines or one of the four sense lines.

7. The system of claim 1, wherein the voltage limiting barrier comprises:
    a first shunt device coupled to a power source and to a power input of the touch screen controller;
    a second shunt device coupled to a data input port of the touch screen controller; and
    a third shunt device coupled to a data output port of the touch screen controller.

8. The system of claim 7, wherein at least one of the shunt devices comprises a zener barrier.

9. The system of claim 1, wherein the touch screen is located in a hazardous area, and the current limiting barrier, the touch screen controller and the voltage limiting barrier are located in a non-hazardous area.

10. The system of claim 9, wherein the non-hazardous area comprises an enclosure.

11. The system of claim 9, wherein the non-hazardous area comprises an area that is physically isolated from the hazardous area.

12. A touch screen system, comprising:
    a touch screen;
    a current limiting barrier coupled to the touch screen;
    a touch screen controller coupled to the current limiting barrier, wherein the controller is also indirectly coupled to the touch screen via the current limiting barrier; and
    a voltage limiting barrier coupled to the touch screen controller and to a power supply, wherein the voltage limiting barrier is also indirectly coupled to the touch screen via the touch screen controller and the current limiting barrier,
    wherein the current limiting barrier limits current to the touch screen to a level that is intrinsically safe, and wherein the current limiting barrier and the voltage limiting barrier in operation together form an intrinsically safe barrier.

13. The system of claim 12, wherein:
the touch screen comprises a resistive touch screen having a plurality of drive and/or sense wires; and
the current limiting barrier comprises a plurality of resistors, wherein each wire of the resistive touch screen is coupled to one of the resistors in the current limiting barrier.

14. The system of claim 13, wherein the voltage limiting barrier comprises:
a first shunt device coupled to a power source and to a power input of the touch screen controller;
a second shunt device coupled to a data input port of the touch screen controller; and
a third shunt device coupled to a data output port of the touch screen controller.

15. The system of claim 14, wherein at least one the shunt devices comprises a zener barrier.

16. The system of claim 13, wherein:
the touch screen comprises a 4-wire resistive touch screen having:
a first screen member coated with a first layer of resistive material and having a first pair of conductive bars positioned to impart a voltage in a first direction across the first screen member when energized,
a second screen member coated with a second layer of resistive material and having a second pair of conductive bars positioned to impart a voltage in a second direction across the second screen member when energized, wherein the second direction is perpendicular to the first direction,
a spacer positioned between the first and second screen members, and
four drive lines, wherein each member of a first pair of the four drive lines is coupled to one member of the first pair of conductive bars, and each member of a second pair of the four drive lines is coupled to one member of the second pair of conductive bars; and
the current limiting barrier comprises:
four pairs of resistors, wherein a first resistor in each pair is coupled to one of the four drive lines, and the second resistor in each pair is coupled to the drive line coupled to the first resistor as a sense line.

17. The system of claim 13, wherein:
the touch screen comprises an 8-wire resistive touch screen having:
a first screen member coated with a first layer of resistive material and having a first pair of conductive bars positioned to impart a voltage in a first direction across the first screen member when energized,
a second screen member coated with a second layer of resistive material and having a second pair of conductive bars positioned to impart a voltage in a second direction across the second screen member when energized, wherein the second direction is perpendicular to the first direction,
a spacer positioned between the first and second screen members,
four sense lines, and
four drive lines; and
the current limiting barrier comprises:
eight resistors, wherein it resistor is coupled to one of the four drive lines or one of the four sense lines.

18. The system of claim 12, wherein the touch screen is located in a hazardous area, and the current limiting barrier, the touch screen controller and the voltage limiting barrier are located in a non-hazardous area.

19. A touch screen system, comprising:
a touch screen;
a current limiting barrier that, in operation, limits current delivered to the touch screen to a level that is intrinsically safe;
a voltage limiting barrier, that, in operation together with the current limiting barrier, forms an intrinsically safe barrier; and
a touch screen controller coupled to each of the touch screen, the current limiting barrier and the voltage limiting barrier in a configuration such that a signal transmitted between the controller and the touch screen will travel through the current limiting barrier.

20. The system of claim 19, wherein:
the touch screen comprises a resistive touch screen having a plurality of drive and/or sense wires; and
the current limiting barrier comprises a plurality of resistors, wherein each wire of the resistive touch screen is coupled to one of the resistors in the current limiting barrier.

21. The system of claim 20, wherein the voltage limiting barrier comprises:
a first shunt device coupled to a power source and to a power input of the touch screen controller;
a second shunt device coupled to a data input port of the touch screen controller; and
a third shunt device coupled to a data output port of the touch screen controller.

* * * * *